United States Patent
Zhang et al.

(10) Patent No.: US 9,705,784 B2
(45) Date of Patent: Jul. 11, 2017

(54) BIT INDEX EXPLICIT REPLICATION (BIER)FORWARDING FOR NETWORK DEVICE COMPONENTS

(71) Applicant: Juniper Networks, Inc., Sunnyvale, CA (US)

(72) Inventors: Zhaohui Zhang, Westford, MA (US); Alex Baban, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 72 days.

(21) Appl. No.: 14/753,313

(22) Filed: Jun. 29, 2015

(65) Prior Publication Data
US 2016/0191372 A1    Jun. 30, 2016

Related U.S. Application Data

(60) Provisional application No. 62/098,501, filed on Dec. 31, 2014.

(51) Int. Cl.
| H04L 12/761 | (2013.01) |
| H04L 12/935 | (2013.01) |
| H04L 12/931 | (2013.01) |

(52) U.S. Cl.
CPC .......... *H04L 45/16* (2013.01); *H04L 49/201* (2013.01); *H04L 49/30* (2013.01); *H04L 49/3009* (2013.01)

(58) Field of Classification Search
CPC ....... H04L 25/16; H04L 49/201; H04L 49/30; H04L 49/3009
See application file for complete search history.

(56) References Cited

U.S. PATENT DOCUMENTS

| 8,325,726 B2 | 12/2012 | Baban et al. |
| 2006/0222012 A1* | 10/2006 | Bhargava ................ H04L 45/00 370/473 |
| 2011/0194557 A1 | 8/2011 | Baban et al. |
| 2013/0028072 A1* | 1/2013 | Addanki ............... H04L 49/557 370/218 |
| 2014/0241357 A1* | 8/2014 | Liu ....................... H04L 45/745 370/392 |
| 2016/0119159 A1* | 4/2016 | Zhao ..................... H04L 45/16 370/390 |

(Continued)

OTHER PUBLICATIONS

Psenak et al., "OSPF Extensions for BIER," https://tools.ietf.org/html/draft-psenak-ospf-bier-extensions-00, Sep. 27, 2014, 6 pages.

(Continued)

*Primary Examiner* — Albert T Chou
(74) *Attorney, Agent, or Firm* — Harrity & Harrity, LLP

(57) ABSTRACT

A network device receives multicast packets that include information identifying destinations in the network, identifies next hops associated with the destinations, and populates a cache with the destinations and addresses of the identified next hops. The network device receives a particular multicast packet that includes information identifying particular destinations included in the cache, identifies one or more next hops for the particular destinations from the cache, and forwards the particular multicast packet to the identified one or more next hops to permit the identified one or more next hops to forward the multicast packet toward the particular destinations.

20 Claims, 12 Drawing Sheets

(56) References Cited

U.S. PATENT DOCUMENTS

2016/0127142 A1* 5/2016 Tian .................. H04L 12/1886
                                                      370/390

OTHER PUBLICATIONS

Rosen et al., "Multicast VPN Using BIER," https://tools.ietf.org/html/draft-rosen-l3vpn-mvpn-bier-00, Sep. 23, 2014, 8 pages.

Shepherd et al., "Bit Indexed Explicit Replication (BIER) Problem Statement," https://tools.ietf.org/html/draft-shepherd-bier-problem-statement-00, Sep. 25, 2014, 11 pages.

Wijnands et al., "Multicast using Bit Index Explicit Replication," https://tools.ietf.org/html/draft-wijnands-bier-architecture-00, Sep. 22, 2014, 24 pages.

Wijnands et al., "Multicast using Bit Index Explicit Replication," https://tools.ietf.org/html/draft-wijnands-bier-architecture-01, Oct. 16, 2014, 24 pages.

Wijnands et al., "Encapsulation for Bit Index Explicit Replication in MPLS Networks," https://tools.ietf.org/html/draft-wijnands-mpls-bier-encapsulation-00, Sep. 22, 2014, 10 pages.

Extended European Search Report corresponding to EP 15178621.7, mailed May 20, 2016, 10 pages.

Wijnands et al., "Multicast Using Bit Index Explicit Replication; draft-ietf-bier-architecture-01.txt", Internet Engineering Task Force, Standard Working Draft, Geneva Switzerland, Jun. 25, 2015, pp. 1-35.

Wijnands et al., "Multicast Using Bit Index Explicit Replication; draft-ietf-bier-architecture-01.txt", Internet Engineering Task Force, Standard Working Draft, Geneva Switzerland, Oct. 16, 2014, pp. 1-24.

Przygienda et al., "BIER Support via ISIS; draft-przgienda-bier-isis-ranges-01.txt", Internet Engineering Task Force, Standard Working Draft, Geneva Switzerland, Oct. 24, 2014, pp. 1-9.

* cited by examiner

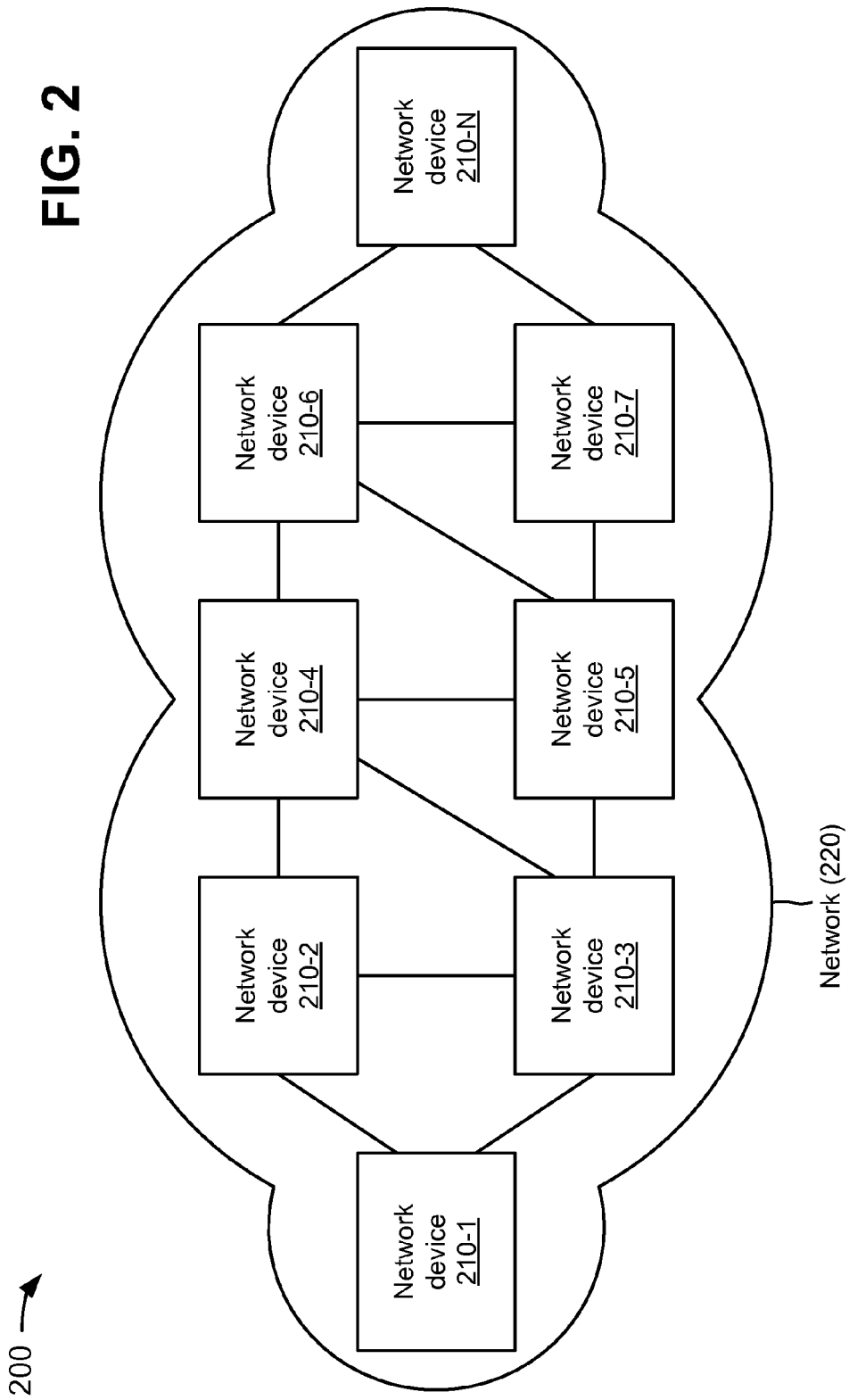

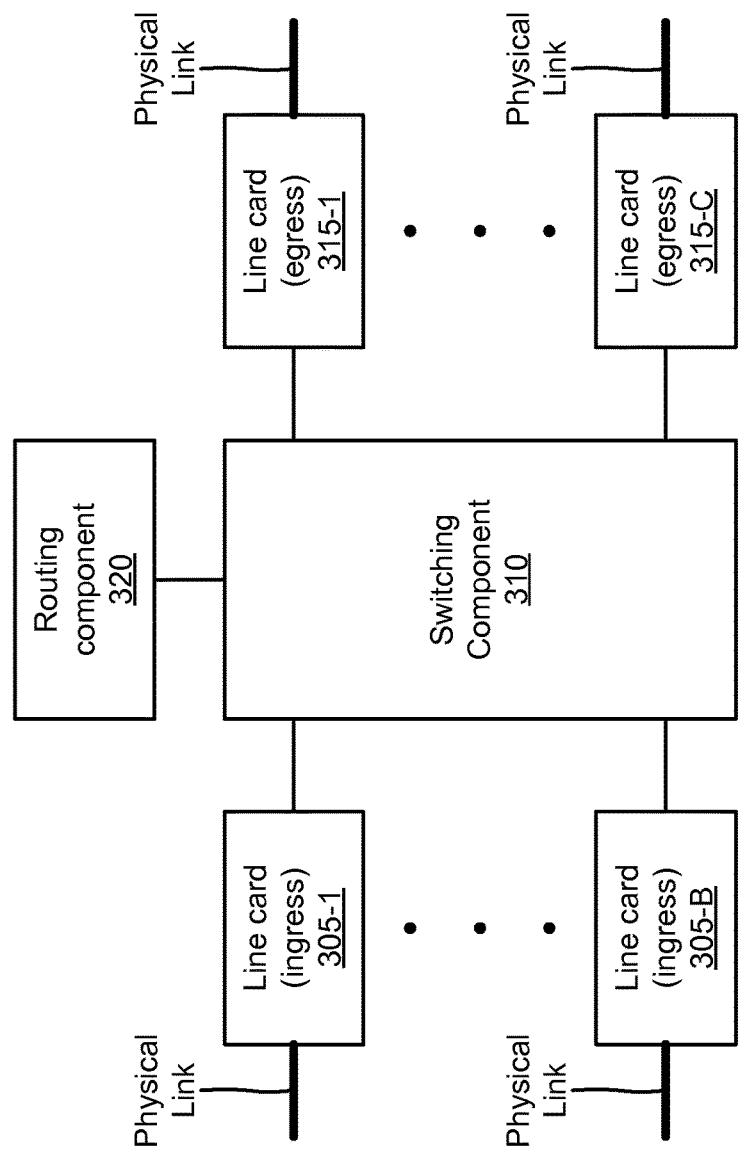

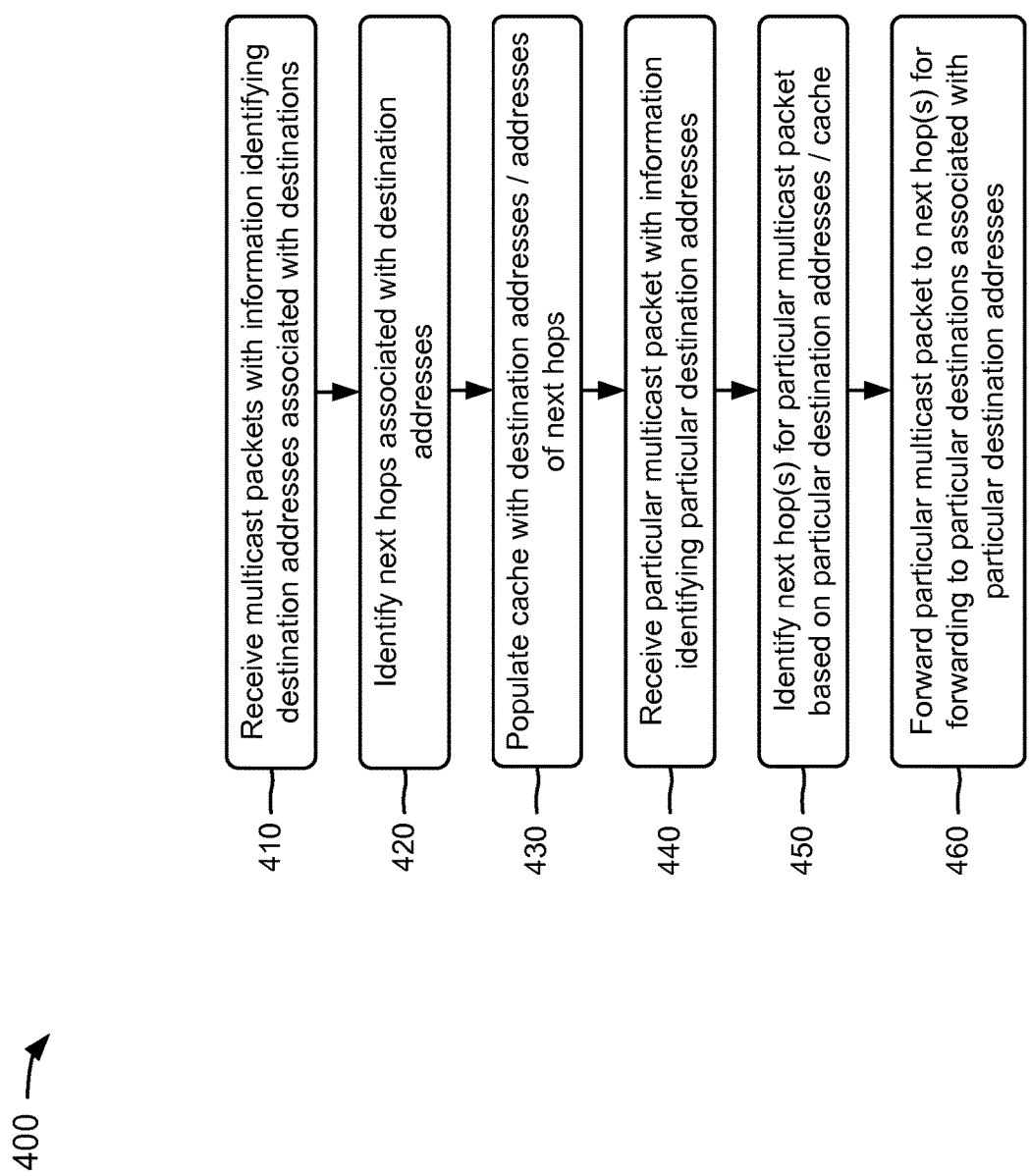

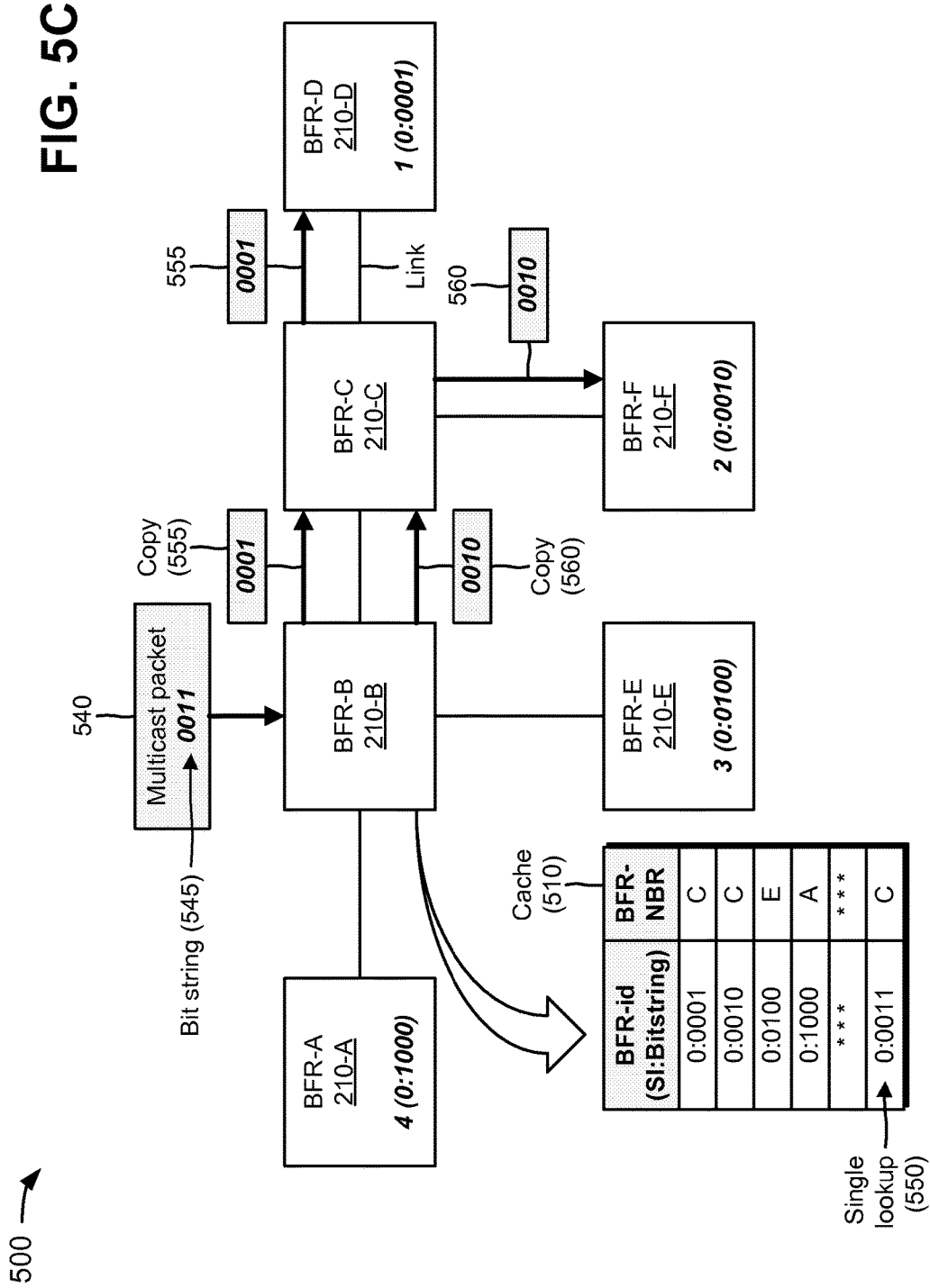

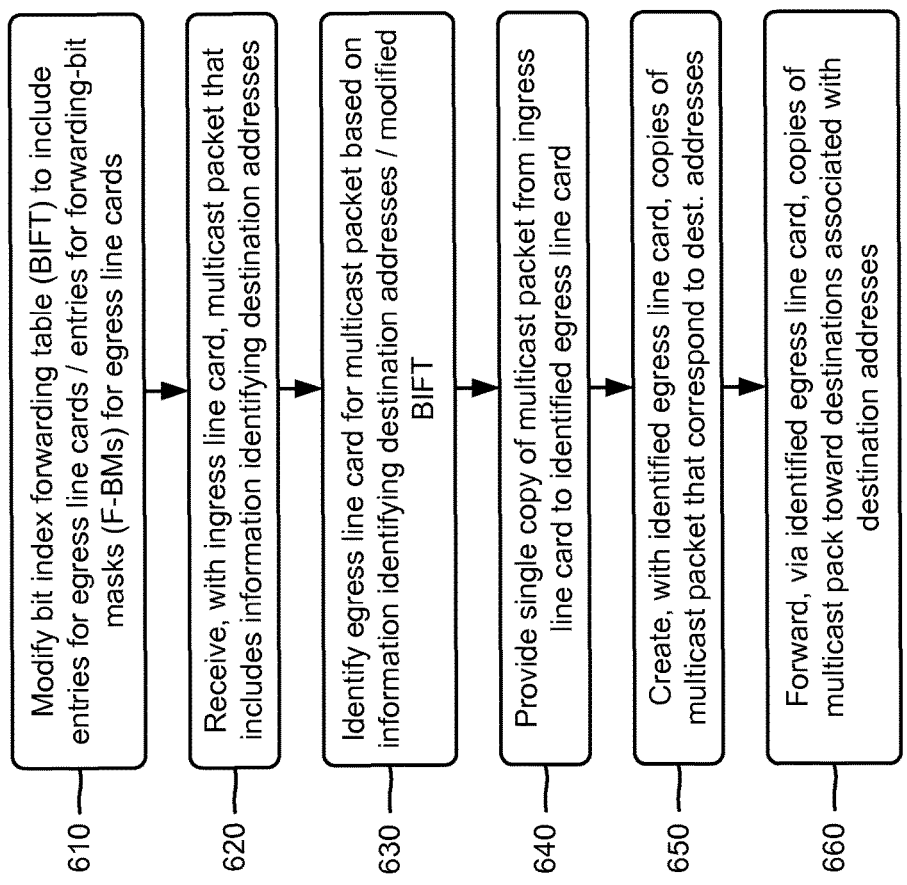

BIT INDEX EXPLICIT REPLICATION (BIER)FORWARDING FOR NETWORK DEVICE COMPONENTS

RELATED APPLICATION

This application claims priority under 35 U.S.C. §119 based on U.S. Provisional Patent Application No. 62/098,501, filed Dec. 31, 2014, the disclosure of which is incorporated by reference herein in its entirety.

BACKGROUND

Over time, forwarding rates for routers have increased rapidly, whereas control plane processing capabilities have increased at a slower rate. A ratio between forwarding plane speeds and control plane speeds is very large (e.g., a factor of one-thousand or greater) and has been increasing over time. Existing methods for Internet protocol (IP) multicast are relatively control-plane intensive. One approach, known as a bit index explicit replication (BIER) forwarding method, has been introduced into the Internet Engineering Task Force (IETF) to allow many multicast groups to be simultaneously supported with minimal state in a core of a network. In the BIER forwarding method, only an ingress router for any particular packet flow needs to know which egress routers need to receive any particular packet. The BIER forwarding method does not require any explicit tree-building protocol, nor does the BIER forwarding method require intermediate routers to maintain any per-flow state. A router that implements the BIER forwarding method is known as a bit-forwarding router (BFR).

In the BIER forwarding method, a multicast packet includes a bit string that indicates end or destination BFRs to receive the multicast packet, and each end BFR includes a unique identifier (ID) that maps to a bit of the bit string. Each next hop BFR analyzes the bit string and replicates the multicast packet to neighboring BFRs that are on a shortest path to the end BFRs indicated by the bits in the bit string.

SUMMARY

In some implementations, a network device may include an ingress line card, one or more egress line cards, and one or more processors to modify a forwarding table to include information associated with the one or more egress line cards and information associated with masks for the one or more egress line cards. The forwarding table may include information associated with destinations and information associated with next hops for the destinations, and the masks may indicate destinations reachable via corresponding next hops. The one or more processors may receive, via the ingress line card, a multicast packet that includes information identifying destinations for the multicast packet; identify an egress line card, of the one or more egress line cards, for receiving the multicast packet based on the information identifying the destinations and based on the modified forwarding table; cause the ingress line card to provide the multicast packet to the identified egress line card; create, via the identified egress line card, copies of the multicast packet; and forward, via the identified egress line card, the copies of the multicast packet toward some of the destinations.

In some implementations, a method may include modifying, by a network device provided in a network, a forwarding table to include information associated with one or more egress line cards of the network device and information associated with masks for the one or more egress line cards; and receiving, by an ingress line card of the network device, a multicast packet that includes information identifying destination addresses for the multicast packet. The method may include identifying, by the network device, an egress line card, of the one or more egress line cards, for receiving the multicast packet based on the information identifying the destinations and based on the modified forwarding table; causing, by the network device, the ingress line card to provide a single copy of the multicast packet to the identified egress line card; creating, by the identified egress line card, copies of the multicast packet; and forwarding, by the identified egress line card, the copies of the multicast packet toward some of the destinations.

In some implementations, a network device, associated with a bit index explicit replication (BIER) forwarding method, may include one or more processors to: receive multicast packets that include information identifying destinations; identify next hops associated with the destinations; populate a cache with the destinations and addresses of the identified next hops; receive a particular multicast packet that includes information identifying particular destinations; determine whether the particular destinations are included in the cache; and when the particular destinations are included in the cache: identify one or more next hops for the particular destinations from the cache, and forward the particular multicast packet to the identified one or more next hops to permit the identified one or more next hops to forward the multicast packet toward the particular destinations.

In some implementations, a method may include receiving, by a network device in a network, multicast packets that include information identifying destinations in the network; and identifying, by the network device, next hops associated with the destinations. The method may also include populating, by the network device, a cache with the destinations and addresses of the identified next hops; and receiving, by the network device, a particular multicast packet that includes information identifying particular destinations, where the particular destinations are included in the cache. The method may include identifying, by the network device, one or more next hops for the particular destinations from the cache; and forwarding, by the network device, the particular multicast packet to the identified one or more next hops to permit the identified one or more next hops to forward the multicast packet toward the particular destinations.

BRIEF DESCRIPTION OF THE DRAWINGS

FIG. 2 is a diagram of an example environment in which systems and/or methods, described herein, may be implemented;

FIG. 3 is a diagram of example components of a network device of FIG. 2;

FIG. 4 is a flow chart of an example process for populating a cache in a network device and for forwarding a multicast packet based on information in the cache;

FIGS. 5A-5C are diagrams of an example implementation relating to the example process shown in FIG. 4;

FIG. 6 is a flow chart of an example process for modifying a BIFT of a network device and for forwarding a multicast packet based on information in the modified BIFT.

DETAILED DESCRIPTION

Figure 1A:
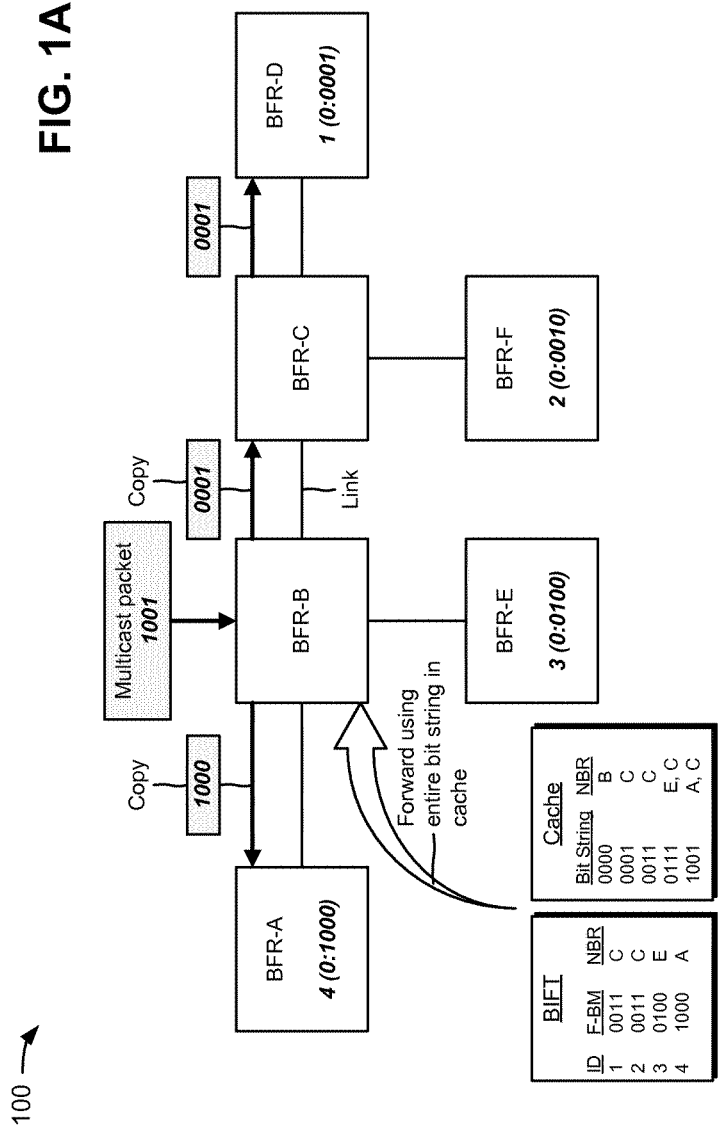
FIGS. 1A and 1B are diagrams of an overview of an example implementation described herein.

The following detailed description of example implementations refers to the accompanying drawings. The same reference numbers in different drawings may identify the same or similar elements.

The BIER forwarding method makes use of a bit index forwarding table (BIFT). Each potential destination for a packet (e.g., represented by a unique single bit in a forwarding bit mask (F-BM)) has only a single possible next hop. Each entry in the BIFT (e.g., corresponding to a particular possible destination) includes a single row that specifies a single F-BM corresponding to a particular next hop. In the BIER forwarding method, a first copy of a multicast packet may be sent to a first neighbor BFR that is on a shortest path to a first subset of end BFRs to receive the multicast packet, a second copy of the multicast packet may be sent to a second neighbor BFR that is on a shortest path to a second subset of end BFRs to receive the multicast packet, and so on.

A particular BFR receiving the multicast packet may analyze a lowest bit in the multicast packet's bit string, and may look up the lowest bit in the BIFT. A row in the BIFT may identify a neighbor BFR to which to send a copy of the multicast packet, and a F-BM may indicate all end BFRs that are reachable by the neighbor BFR. The particular BFR may set a bit string of the packet copy to a combination of the multicast packet's bit string and the F-BM, and may provide the packet copy to the neighbor BFR. The particular BFR may analyze a next lowest bit in the multicast packet's bit string in order to provide another packet copy to another neighbor BFR, and may repeat this process for each bit of the multicast packet's bit string.

A component (e.g., an ingress line card) of the particular BFR may perform the BIER forwarding functions for the multicast packet described above. For example, the ingress line card may perform the multiple lookups of the BIFT for the bits of the multicast packet's bit string, and may provide the packet copies to another component (e.g., an egress line card) of the particular BFR via a switching component (e.g., a switching fabric). However, the ingress line card may provide multiple packet copies to the egress line card even if the neighbor BFRs to receive the multicast packet are associated with the same egress line card. Further, some ingress line cards and/or switching fabrics may be incapable of performing such forwarding functions, especially at high data rates.

Systems and/or methods, described herein, may extend the BIER forwarding method to a component level of a network device. The systems and/or methods may utilize a cache (e.g., instead of the BIFT) that enables an egress component of the network device to analyze an entire bit string (e.g., rather than each bit individually) of a multicast packet when forwarding the multicast packet. The systems and/or methods may enable an ingress component of the network device to forward a single copy of the multicast packet to the egress component (e.g., to minimize traffic in a switching component), and the egress component may create and forward copies of the multicast packet. The systems and/or methods may reduce a processing load on the components of the network device caused by the BIER forwarding method.

Figure 1B:
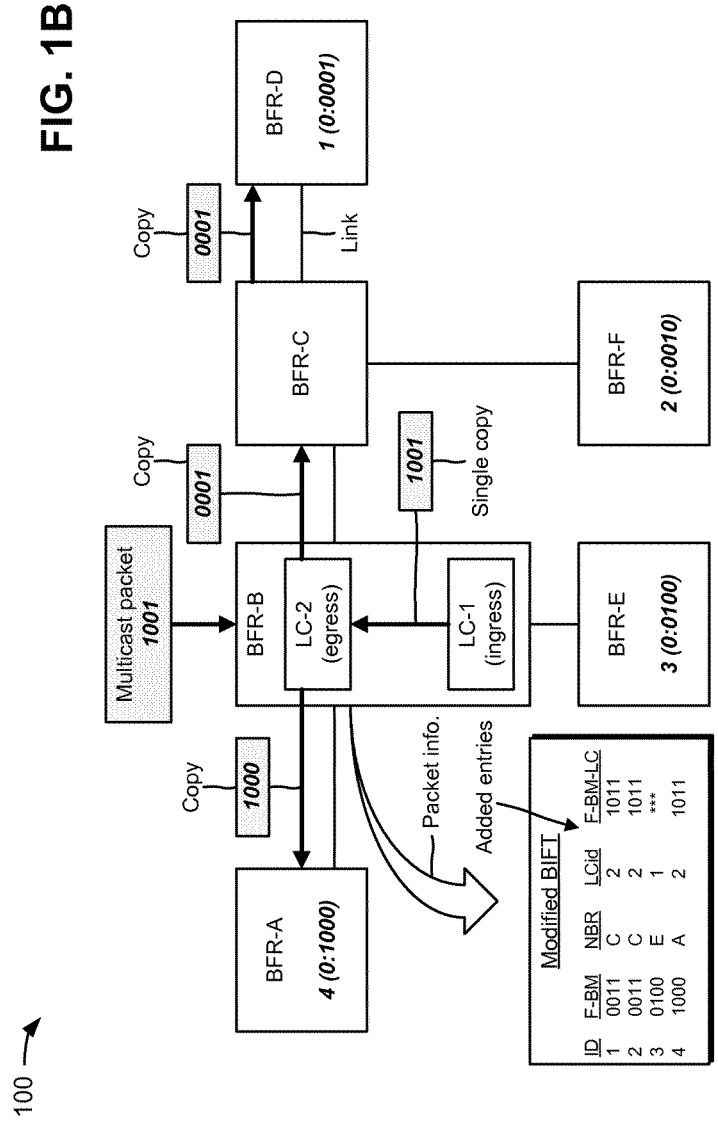

FIGS. 1A and 1B are diagrams of an overview of an example implementation 100 described herein. As shown in FIGS. 1A and 1B, a multicast domain may include multiple network devices, such as bit-forwarding routers BFR-A, BFR-B, BFR-C, BFR-D, BFR-E, and BFR-F, interconnected by links. Each BFR in the multicast domain may be assigned a unique BFR identifier (BFR-id). Assume that BFR-D includes a BFR-id of one (1), a set identifier (SI) of zero (0), and a bit string of 0001 (e.g., where 0:0001 identifies the SI and the bit string of BFR-D). The SI and the bit string may be used to identify a set of egress BFRs (BFERs) to which a packet is to be delivered. Assume that BFR-F includes a BFR-id of two (2), a SI of zero (0), and a bit string of 0010 (e.g., where 0:0010 identifies the SI and the bit string of BFR-F). Assume that BFR-E includes a BFR-id of three (3), a SI of zero (0), and a bit string of 0100 (e.g., where 0:0100 identifies the SI and the bit string of BFR-E). Assume that BFR-A includes a BFR-id of four (4), a SI of zero (0), and a bit string of 1000 (e.g., where 0:1000 identifies the SI and the bit string of BFR-A). Thus, placement of 1s in a bit string (e.g., from right to left) may provide a mapping to a BFR-id associated with a BFR. For example, a bit string of 0001 may correspond to BFR-id 1 (e.g., BFR-D); a bit string of 0010 may correspond to BFR-id 2 (e.g., BFR-F); a bit string of 0100 may correspond to BFR-id 3 (e.g., BFR-E); and a bit string of 1000 may correspond to BFR-id 4 (e.g., BFR-A).

As shown in FIG. 1A, each BFR may utilize a BIFT, and each BIFT may include information identifying a next hop for each destination. For example, BFR-B (e.g., an ingress BFR) may utilize a BIFT to forward packets, and the BIFT may include a column for BFR-ids (e.g., 1, 2, 3, and 4), a column for forwarding-bit masks (F-BMs), and a column for neighbor BFRs (BFR-NBRs). Neighbor BFRs of a particular BFR may include BFRs that are adjacent to and connected by a direct link to the particular BFR. The F-BM may include a bit mask that corresponds to a combination of the SI and the BFR-NBR.

In some implementations, as further shown in FIG. 1A, BFR-B may include a cache with a column for bit strings (e.g., 0000, 0001, 0011, etc.) and a column for neighbor BFRs (BFR-NBRs). The cache may initially be empty, and BFR-B may receive multicast packets that include bit strings identifying destination addresses, and may identify next hop or neighbor BFRs associated with the destination addresses. BFR-B may populate the cache with the bit strings and information identifying the neighbor BFRs. As further shown in FIG. 1A, assume that a multicast packet arrives at BFR-B and includes a packet header with a bit string of 1001. The 0001 portion of the bit string in the packet header may indicate that the multicast packet is to be delivered to a BFR with a BFR-id of 1 (e.g., BFR-D), and the 1000 portion of the bit string may indicate that the multicast packet is to be delivered to a BFR with a BFR-id of 4 (e.g., BFR-A). BFR-B may utilize the entire bit string of the packet to identify an entry in the cache. For example, BFR-B may identify the entry in the cache that indicates that copies of the multicast packet are to be sent to neighbor BFR-A and neighbor BFR-C. As further shown in FIG. 1A, copies of the multicast packet may be forwarded to BFR-A and BFR-C (e.g., and provided BFR-D) in accordance with the entry in the cache.

In some implementations, as shown in FIG. 1B, each BFR (e.g., BFR-B) may include components, such as a first (ingress) line card (LC-1) and a second (egress) line card (LC-2). BFR-B may modify the BIFT to include an additional column that includes line card identifiers (e.g., 1, 2, or the like) and an additional column that identifies forwarding-bit masks for the line cards (F-BM-LC). As further shown in FIG. 1B, assume that a multicast packet arrives at the ingress line card of BFR-B and includes a packet header with a bit string of 1001. The ingress line card of BFR-B may utilize the bit string of the multicast packet to identify an entry in the modified BIFT. For example, the ingress line card may determine that a single copy of the multicast packet is to be provided to the egress line card of BFR-B, and may provide the copy of the multicast packet to the egress line card. The egress line card may create copies of the multicast packet that are to be sent to neighbor BFR-A and neighbor BFR-C. As further shown in FIG. 1B, the egress line card of BFR-B may forward copies of the multicast packet to BFR-A and BFR-C in accordance with the entry in the modified BIFT. BFR-C may provide the copy of the multicast packet to BFR-D based on the bit string 0001.

Systems and/or methods, described herein, may extend the BIER forwarding method to a component level of a network device in order to reduce a processing load on the components of the network device caused by the BIER forwarding method.

FIG. 2 is a diagram of an example environment 200 in which systems and/or methods, described herein, may be implemented. As shown in FIG. 2, environment 200 may include one or more network devices 210-1 through 210-N (N≥1) (hereinafter referred to collectively as network devices 210, and individually as network device 210) and a network 220. Devices of environment 200 may interconnect via wired connections, wireless connections, or a combination of wired and wireless connections.

Network device 210 may include a device capable of receiving, transmitting, processing, routing, or the like, packets travelling via network 220. For example, network device 210 may include a router, a switch, a gateway, a modem, a firewall, a network interface controller (NIC), a hub, a bridge, an optical add-drop multiplexer (OADM), or another type of network device. In some implementations, network device 210 may include one or more input ports associated with receiving packets and one or more output ports associated with transmitting packets. In some implementations, network device 210 may be connected to one or more other network devices 210. In some implementations, network device 210 may communicate with other devices (not shown) in order to process and/or route packets received by network device 210. Although implementations are described herein in connection with BFRs as network devices 210, the systems and/or methods, described herein, may be utilized with other types of network devices 210 (e.g., other than BFRs).

Network 220 may include one or more wired and/or wireless networks that include network devices 210 and/or allow network devices 210 to communicate. For example, network 220 may include a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

FIG. 3 is a diagram of example components of a network device 210. As shown in FIG. 3, network device 210 may include one or more ingress line cards 305-1 through 305-B (B≥1) (hereinafter referred to collectively as ingress line cards 305, and individually as ingress line card 305), a switching component 310, one or more egress line cards 315-1 through 315-C (C≥1) (hereinafter referred to collectively as egress line card 315, and individually as egress line card 315), and a routing component 320.

Ingress line card 305 may be a point of attachment for a physical link and may be a point of entry for incoming traffic, such as packets. Ingress line card 305 may process incoming traffic, such as by performing data link layer encapsulation or decapsulation. In some implementations, ingress line card 305 may send and/or receive packets. In some implementations, ingress line card 305 may include an input line card that includes one or more packet processing components (e.g., in the form of integrated circuits), such as one or more interface cards (IFCs), packet forwarding components, line card controller components, input ports, processors, memories, and/or input queues. In some implementations, network device 210 may include one or more ingress line cards 305. Ingress line card 305 may perform route lookup for packets, using forwarding tables, to determine destination information. If the destination information indicates that the packets should be sent to another line card (e.g., egress line card 315) via switching component 310, then ingress line card 305 may prepare the packets for transmission to the other line card, if necessary, and may send the packets to the other line card, via switching component 310.

Switching component 310 may interconnect ingress line cards 305 with egress line cards 315. In some implementations, switching component 310 may be implemented via one or more crossbars, via one or more busses, and/or with one or more shared memories. The shared memories may act as temporary buffers to store packets from ingress line cards 305 before the packets are eventually scheduled for delivery to egress line cards 315. In some implementations, switching component 310 may enable ingress line cards 305, egress line cards 315, and/or routing component 320 to communicate.

Egress line card 315 may be a point of attachment for a physical link and may be a point of exit for outgoing traffic, such as packets. Egress line card 315 may store packets and may schedule packets for transmission on output physical links. Egress line card 315 may support data link layer encapsulation or decapsulation, and/or a variety of higher-level protocols. In some implementations, egress line card 315 may send packets and/or receive packets. In some implementations, egress line card 315 may include an output line card that includes one or more packet processing components (e.g., in the form of integrated circuits), such as one or more IFCs, packet forwarding components, line card controller components, output ports, processors, memories, and/or output queues. In some implementations, network device 210 may include one or more egress line cards 315. Egress line card 315 may perform route lookup for packets, using forwarding tables, to determine destination information. If the destination information indicates that the packets should be sent out on a physical interface, then egress line card 315 may prepare the packets for transmission by, for example, adding any necessary headers, and may transmit the packets.

In some implementations, network device 210 may include one or more egress line cards 315. In some implementations, ingress line card 305 and egress line card 315 may be implemented by the same set of components (e.g., an input/output line card may be a combination of ingress line card 305 and egress line card 315).

Routing component 320 may include one or more processors, such as one or more microprocessors, application-specific integrated circuits (ASICs), field programmable gate arrays (FPGAs), or similar types of processing components. A processor is implemented in hardware, firmware, or a combination of hardware and software. In some implementations, routing component 320 may include a random access memory (RAM), a read only memory (ROM), and/or another type of dynamic or static storage device (e.g., a flash memory, a magnetic memory, an optical memory, etc.) that stores information and/or instructions. In some implementations, routing component 320 may communicate with other devices, networks, and/or systems connected to network device 210 to exchange information regarding network topology. Routing component 320 may create routing tables based on the network topology information, create forwarding tables based on the routing tables, and forward the forwarding tables to ingress line cards 305 and/or egress line cards 315. Ingress line cards 305 and/or egress line cards 315 may use the forwarding tables to perform route lookups for incoming and/or outgoing packets.

The number and arrangement of components shown in FIG. 3 are provided as an example. In practice, network device 210 may include additional components, fewer components, different components, or differently arranged components than those shown in FIG. 3. Additionally, or alternatively, a set of components (e.g., one or more components) of network device 210 may perform one or more functions described as being performed by another set of components of network device 210.

FIG. 4 is a flow chart of an example process 400 for populating a cache in a network device and for forwarding a multicast packet based on information in the cache. In some implementations, one or more process blocks of FIG. 4 may be performed by network device 210. In some implementations, one or more process blocks of FIG. 4 may be performed by another device or a group of devices separate from or including network device 210. In some implementations, one or more process blocks of FIG. 4 may be performed by one or more components of network device 210, such as ingress line cards 305, egress line cards 315, or the like.

As shown in FIG. 4, process 400 may include receiving multicast packets with information identifying destination addresses associated with destinations (block 410). For example, a multicast domain may include multiple network devices 210, such as multiple BFRs. In some implementations, a particular BFR (e.g., an ingress BFR), of the multiple BFRs, may receive multicast packets that include (e.g., in packet headers) information identifying destination addresses associated with destinations (e.g., other BFRs) in the multicast domain. In some implementations, each multicast packet may include (e.g., in a packet header) information that corresponds to a particular set of BFRs (e.g., that correspond to a particular bit string).

As further shown in FIG. 4, process 400 may include identifying next hops associated with the destination addresses (block 420). For example, the ingress BFR may identify next hop BFRs (e.g., neighbor BFRs) associated with the destinations (e.g., the other BFRs). In some implementations, the ingress BFR may include a BIFT, and the BIFT may include information identifying a next hop for each destination. For example, the ingress BFR may utilize the BIFT to forward packets, and the BIFT may include a column for BFR-ids, a column for forwarding-bit masks (F-BMs), and a column for neighbor BFRs (BFR-NBRs). Neighbor BFRs of the ingress BFR may include BFRs that are adjacent to and connected by a direct link to the ingress BFR. The F-BM may include a bit mask that corresponds to a combination of the SI and the BFR-NBR. In some implementations, the ingress BFR may analyze the bit string for each multicast packet, and may utilize the BIFT and the bit string to identify the next hops for the destinations.

As further shown in FIG. 4, process 400 may include populating a cache with the destination addresses and addresses of the next hops (block 430). For example, the ingress BFR may include a forwarding data structure (e.g., a table, a list, a database, or the like, referred to herein as a "cache") that is initially empty. In some implementations, the ingress BFR may populate the cache with the destination addresses and addresses of the identified next hops. In some implementations, the cache may include a column for BFR-ids (e.g., bit strings) and a column for neighbor BFRs (BFR-NBRs) associated with the ingress BFR.

In some implementations, for each multicast packet, the ingress BFR may determine whether the multicast packet includes a bit string that matches a bit string provided in an entry of the cache. If the bit string of the multicast packet does not match a bit string provided in an entry of the cache, the ingress BFR may forward the multicast packet using the BIER forwarding method, and may populate the cache with the destination addresses and the next hop addresses associated with the multicast packet. If the bit string of the multicast packet matches a bit string provided in an entry of the cache, the ingress BFR may forward the multicast packet using the cache, as described below. In some implementations, the entries of the cache may time out and be removed after a predetermined time period (e.g., in seconds, minutes, hours, or the like). In some implementations, the ingress BFR may store the cache and/or may program the cache into a data plane used to forward multicast packets.

As further shown in FIG. 4, process 400 may include receiving a particular multicast packet with information identifying particular destination addresses (block 440). For example, the ingress BFR may receive a particular multicast packet that includes a packet header. In some implementations, the packet header may include information identifying multiple destination addresses. For example, assume that the multicast domain includes BFRs associated with BFR-ids 1, 2, 3, and 4, and that the packet header includes a bit string of 1110. Such a bit string may indicate that the particular multicast packet is to be delivered to BFRs associated with BFR-ids 2 (e.g., based on 0010 portion of the bit string), 3 (e.g., based on 0100 portion of the bit string), and 4 (e.g., based on 1000 portion of the bit string).

As further shown in FIG. 4, process 400 may include identifying next hop(s) for the particular multicast packet based on the particular destination addresses and the cache (block 450). For example, the ingress BFR may analyze the packet header of the particular multicast packet in order to determine the particular destination addresses. In some implementations, the ingress BFR may perform a hash (e.g., utilizing a hash function) of the packet header in order to identify information contained in the packet header, such as the particular destination addresses. For example, the ingress BFR may perform a hash of some or all of the packet header to identify a bit string. In some implementations, the ingress BFR may utilize the entire bit string to determine whether the bit string of the particular multicast packet matches a bit string provided in an entry of the cache. Such an arrangement may enable the ingress BFR to perform a single lookup of the cache, which may reduce processing load on the ingress BFR (e.g., that is less than the processing load caused the single bit lookup of the BIER forwarding method).

When the bit string of the particular multicast packet matches a bit string provided in an entry of the cache, the ingress BFR may utilize the entry to determine next hops for the particular multicast packet. For example, assume that the ingress BFR determines that the bit string of the particular multicast packet is 1110, and that the particular multicast packet is to be delivered to particular BFRs associated with BFR-ids 2, 3, and 4 based on the bit string. In such an example, the ingress BFR may determine the next hops for the particular multicast packet (e.g., the next hops associated with the particular BFRs) from the corresponding bit string in the cache entry. In some implementations, the ingress BFR may utilize another transformation function, other than the hash function, in order to identify information contained in the packet header, such as a checksum, a check digit, a fingerprint, a randomization function, or the like.

As further shown in FIG. 4, process 400 may include forwarding the particular multicast packet to the identified next hops for forwarding to the particular destinations associated with the particular destination addresses (block 460). For example, the ingress BFR may forward the particular multicast packet to the identified next hops, and the identified next hops may forward the particular multicast packet on to the particular destinations associated with the particular destination addresses provided in the packet header. In some implementations, the ingress BFR may forward copies of the particular multicast packet to different identified next hops.

For example, if the BIFT includes particular entries for forwarding the particular multicast packet to BFRs associated with BFR-ids 2, 3, and 4, the ingress BFR may create a first copy of the particular multicast packet, and may include a bit string of 0010 (e.g., corresponding to BFR-id 2) in a packet header of the first copy of the particular multicast packet. The ingress BFR may provide the first copy of the particular multicast packet to a first next hop, and the first next hop may utilize the bit string of 0010 to forward the first copy of the multicast packet towards a BFR associated with BFR-id 2. The ingress BFR may create a second copy of the particular multicast packet, and may include a bit string of 0100 (e.g., corresponding to BFR-id 3) in a packet header of the second copy of the particular multicast packet. The ingress BFR may provide the second copy of the particular multicast packet to a second next hop, and the second next hop may utilize the bit string of 0100 to forward the second copy of the particular multicast packet towards a BFR associated with BFR-id 3. The ingress BFR may create a third copy of the particular multicast packet, and may include a bit string of 1000 (e.g., corresponding to BFR-id 4) in a packet header of the third copy of the particular multicast packet. The ingress BFR may provide the third copy of the particular multicast packet to a third next hop, and the third next hop may utilize the bit string of 1000 to forward the third copy of the particular multicast packet towards a BFR associated with BFR-id 4.

In some implementations, the ingress BFR may provide one or more copies of the multicast packet directly to the destinations, without utilizing a next hop (e.g., when the destinations are directly connected to the ingress BFR).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
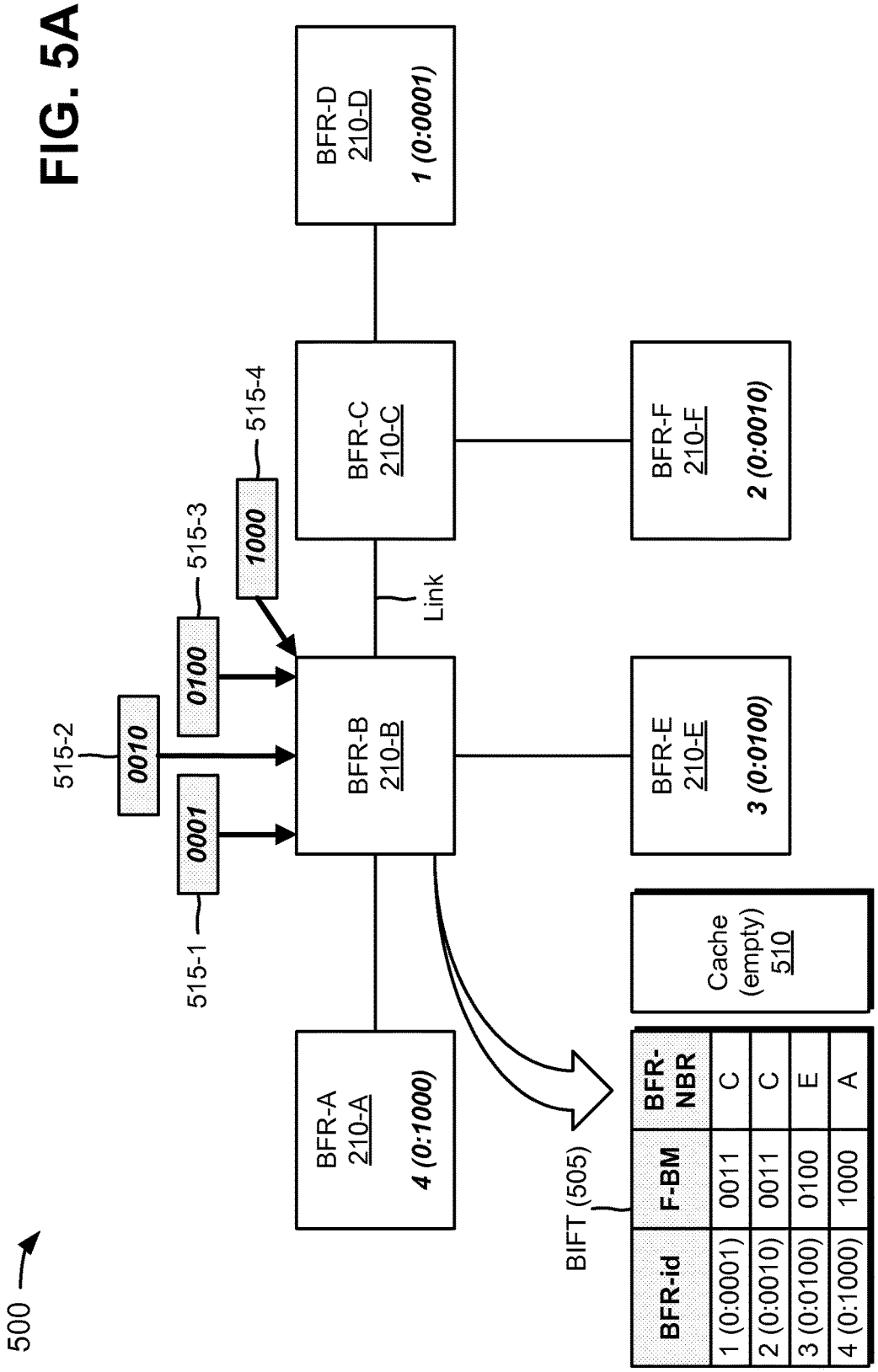
Figure 5B:
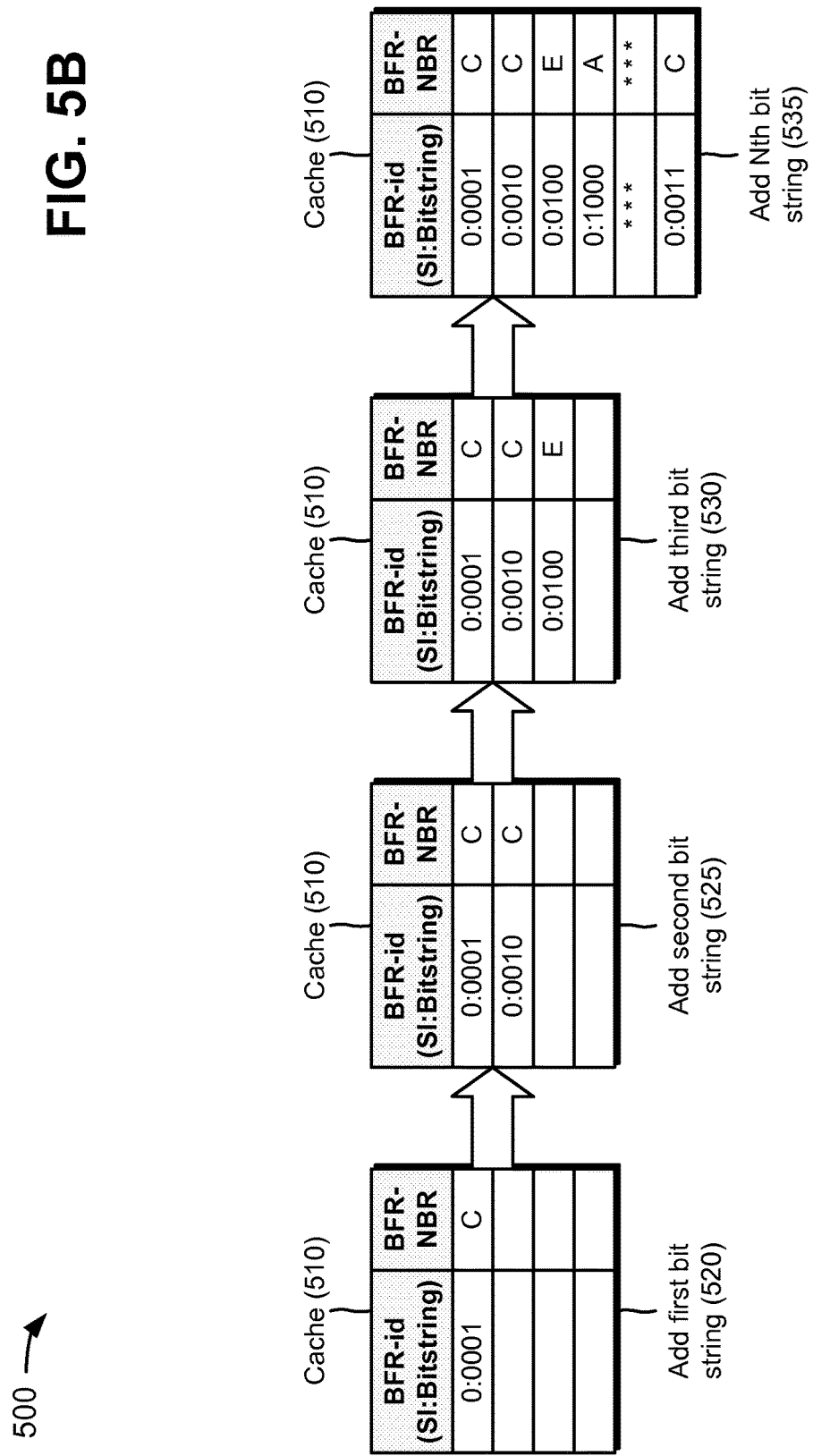

FIGS. 5A-5C are diagrams of an example implementation 500 relating to example process 400 shown in FIG. 4. FIGS. 5A-5C show an example of populating a cache in network device 210, such as a BFR, and forwarding a packet based on the cache.

As shown in FIG. 5A, a multicast domain may include multiple network devices 210, such as BFR-A (210-A), BFR-B (210-B), BFR-C (210-C), BFR-D (210-D), BFR-E (210-E), and BFR-F (210-F), interconnected by links. Each BFR 210 in the multicast domain may be assigned a unique BFR-id. Assume that BFR-D includes a BFR-id of one (1), a SI of zero (0), and a bit string of 0001; BFR-F includes a BFR-id of two (2), a SI of zero (0), and a bit string of 0010; BFR-E includes a BFR-id of three (3), a SI of zero (0), and a bit string of 0100; and BFR-A includes a BFR-id of four (4), a SI of zero (0), and a bit string of 1000. Although such information is not shown for BFR-B and BFR-C in FIG. 5A, BFR-B and BFR-C may also be associated with BFR-ids, SIs, and/or bit strings.

As further shown in FIG. 5A, an ingress BFR (e.g., BFR-B) may include a BIFT 505 and a cache 510 that is initially empty. BIFT 505 may include a column for BFR-ids, a column for forwarding-bit masks (F-BMs), and a column for neighbor BFRs (BFR-NBRs). BFR-B may receive multicast packets 515-1 through 515-4 that include bit strings identifying destination addresses associated with destinations (e.g., BFR-A, BFR-D, BFR-E, BFR-F, or the like). BFR-B may utilize information provided in BIFT 505 and the BIER forwarding method to forward multicast packets 515-1 through 515-4 to the destinations. For example, BFR-B may utilize BIFT 505 to forward packet 515-1 (e.g., with bit string 0001) to BFR-D (e.g., corresponding to bit string 0001); packet 515-2 (e.g., with bit string 0010) to BFR-F (e.g., corresponding to bit string 0010); packet 515-3 (e.g., with bit string 0100) to BFR-E (e.g., corresponding to bit string 0010); and packet 515-4 (e.g., with bit string 1000) to BFR-A (e.g., corresponding to bit string 1000). BFR-B may continue to receive other multicast packets with different bit strings, and may forward the other multicast packets accordingly.

As shown in FIG. 5B, BFR-B may utilize BIFT 505 to populate cache 510 with information (e.g., the bit strings) provided in packets 515-1 through 515-4. For example, BFR-B may analyze packet 515-1 to identify a first bit string (e.g., 0001), and may utilize BIFT 505 to determine a neighbor BFR (e.g., BFR-C) based on the first bit string. BFR-B may provide entries in cache 510 for the first bit string and the neighbor BFR-C, as indicated by reference number 520. BFR-B may analyze packet 515-2 to identify a second bit string (e.g., 0010), and may utilize BIFT 505 to determine a neighbor BFR (e.g., BFR-C) based on the second bit string. BFR-B may provide entries in cache 510 for the second bit string and the neighbor BFR-C, as indicated by reference number 525. BFR-B may analyze packet 515-3 to identify a third bit string (e.g., 0100), and may utilize BIFT 505 to determine a neighbor BFR (e.g., BFR-E) based on the third bit string. BFR-B may provide entries in cache 510 for the third bit string and the neighbor BFR-E, as indicated by reference number 530. BFR-B may continue this process until BFR-B provides entries in cache 510 for an Nth (N≥1) bit string (e.g., 0011) and a neighbor BFR (e.g., BFR-C), as indicated by reference number 535.

As shown in FIG. 5C, after BFR-B populates cache 510 with entries, assume that BFR-B receives a multicast packet 540 that includes a payload and a packet header with a bit string 545 (e.g., 0011). Bit string 545 of 0011 may indicate that multicast packet 540 is to be delivered to BFRs 210 with BFR-ids of 1 (e.g., BFR-D, as indicated by the 0001 portion of bit string 545) and 2 (e.g., BFR-F, as indicated by the 0010 portion of bit string 545). BFR-B may perform a hash of multicast packet 540 to identify bit string 545 of the packet header. BFR-B may compare bit string 545 with the bit strings provided in cache 510 in order determine a matching entry in cache 510. For example, BFR-B may perform a single lookup 550 of cache 510 to determine that bit string 545 matches an entry associated with a neighbor BFR (e.g., BFR-C).

As further shown in FIG. 5C, based on the entry in cache 510, BFR-B may create a first copy 555 of multicast packet 540 that includes a bit string of 0001 in a packet header. BFR-B may forward first packet copy 555 to BFR-C, and BFR-C may receive first packet copy 555. The bit string of 0001 may indicate to BFR-C that first packet copy 555 is to be forwarded to BFR 210 with a BFR-id of 1 (e.g., BFR-D). Therefore, BFR-C may forward first packet copy 555 to BFR-D, and BFR-D may receive first packet copy 555. Further based on the entry in cache 510, BFR-B may create a second copy 560 of multicast packet 540 that includes a bit string of 0010 in a packet header. BFR-B may forward second packet copy 560 to BFR-C, and BFR-C may receive second packet copy 560. The bit string of 0010 may indicate to BFR-C that second packet copy 560 is to be forwarded to BFR 210 with a BFR-id of 2 (e.g., BFR-F). Therefore, BFR-C may forward second packet copy 560 to BFR-F, and BFR-F may receive second packet copy 560.

As indicated above, FIGS. 5A-5C are provided merely as an example. Other examples are possible and may differ from what was described with regard to FIGS. 5A-5C.

FIG. 6 is a flow chart of an example process 600 for modifying a BIFT of a network device and for forwarding a multicast packet based on information in the modified BIFT. In some implementations, one or more process blocks of FIG. 6 may be performed by network device 210. In some implementations, one or more process blocks of FIG. 6 may be performed by another device or a group of devices separate from or including network device 210. In some implementations, one or more process blocks of FIG. 6 may be performed by one or more components of network device 210, such as ingress line cards 305, egress line cards 315, or the like.

As shown in FIG. 6, process 600 may include modifying a bit index forwarding table (BIFT) to include entries for egress line cards and entries for forwarding bit masks (F-BMs) for the egress line cards (block 610). For example, a multicast domain may include multiple network devices 210, such as multiple BFRs. In some implementations, a particular BFR (e.g., an ingress BFR), of the multiple BFRs, may include a BIFT, and the BIFT may include information identifying a next hop for each destination. For example, the ingress BFR may utilize the BIFT to forward packets, and the BIFT may include a column for BFR-ids, a column for forwarding-bit masks (F-BMs), and a column for neighbor BFRs (BFR-NBRs). Neighbor BFRs of the ingress BFR may include BFRs that are adjacent to and connected by a direct link to the ingress BFR. The F-BM may include a bit mask that corresponds to a combination of the SI and the BFR-NBR.

In some implementations, the ingress BFR may include ingress line cards 305 and egress line cards 315. In some implementations, the BIFT of the ingress BFR may be modified to include entries associated with egress line cards 315 and entries associated with F-BMs for egress line cards 315. For example, the BIFT of the ingress BFR may be modified to include a column that includes identifiers for egress line cards 315 (e.g., a LC-id column) and a column for F-BMs associated with egress line cards 315 (e.g., a F-BM-LC column). In one example, assume that a particular egress line card 315 includes an identifier of 2 and communicates with two neighbor BFRs. Further, assume that the first neighbor BFR is associated with a F-BM of 0011 and that the second neighbor BFR is associated with a F-BM of 1000. In such an example, the ingress BFR may modify the BIFT to include entries for the LC-id (e.g., 2) and a F-BM (e.g., 1011) that combines the F-BMs of the first neighbor BFR and the second neighbor BFR. In some implementations, the ingress BFR may store modified BIFT and/or may program the modified BIFT into a data plane used to forward multicast packets.

As further shown in FIG. 6, process 600 may include receiving, with an ingress line card, a multicast packet that includes information identifying destination addresses (block 620). For example, an ingress line card 305 of the ingress BFR may receive a multicast packet that includes a packet header. In some implementations, the packet header may include information identifying multiple destination addresses. For example, assume that the multicast domain includes BFRs associated with BFR-ids 1, 2, 3, and 4, and that the packet header includes a bit string of 1110. Such a bit string may indicate that the multicast packet is to be delivered to BFRs associated with BFR-ids 2 (e.g., based on 0010 portion of the bit string), 3 (e.g., based on 0100 portion of the bit string), and 4 (e.g., based on 1000 portion of the bit string).

As further shown in FIG. 6, process 600 may include identifying an egress line card for the multicast packet based on the information identifying the destination addresses and the modified BIFT (block 630). For example, ingress line card 305 of the ingress BFR may analyze the packet header of the multicast packet in order to identify an egress line card 315 for the multicast packet. In some implementations, ingress line card 305 of the ingress BFR may perform a hash (e.g., utilizing a hash function) of the packet header in order to identify information contained in the packet header (e.g., the destination addresses). For example, ingress line card 305 of the particular BFR may perform a hash of some or all of the packet header to identify the bit string of 1110.

In some implementations, ingress line card 305 of the particular BFR may utilize the bit string and the modified BIFT to determine that the multicast packet is to be delivered to BFRs associated with BFR-ids 2, 3, and 4. In some implementations, ingress line card 305 of the particular BFR may utilize the bit string and the modified BIFT to determine that a particular egress line card 315 (e.g., with LC-id of 2) may deliver the multicast packet to BFRs associated with BFR-ids 2, 3, and 4. In some implementations, ingress line card 305 of the ingress BFR may utilize another transformation function, other than the hash function, in order to identify information contained in the packet header, such as a checksum, a check digit, a fingerprint, a randomization function, or the like.

As further shown in FIG. 6, process 600 may include providing the multicast packet from the ingress line card to the identified egress line card (block 640). For example, ingress line card 305 of the ingress BFR may provide the multicast packet to the particular egress line card 315 (e.g., with LC-id of 2). In some implementations, ingress line card 305 of the ingress BFR may create a copy of the multicast packet, and may forward the copy of the multicast packet to the particular egress line card 315 via switching component 310. Such an arrangement may reduce traffic processing by switching component 310 of the ingress BFR (e.g., that is less than traffic processing incurred during the BIER forwarding method without the modified BIFT).

As further shown in FIG. 6, process 600 may include creating, with the identified egress line card, copies of the multicast packet that correspond to the destination addresses (block 650). For example, the particular egress line card 315 of the ingress BFR may create copies of the multicast packet that correspond to the destination addresses. In some implementations, the particular egress line card 315 of the ingress BFR may identify next hops for the copies of the multicast packet based on the modified BIFT. In some implementations, the particular egress line card 315 of the ingress BFR may utilize the modified BIFT in order to identify the next hops for the copies of the multicast packet. In some implementations, the particular egress line card 315 of the ingress BFR may utilize the entries of the modified BIFT to identify the next hops for the copies of the multicast packet. For example, if the modified BIFT includes particular entries for forwarding the multicast packet to BFRs associated with BFR-ids 2, 3, and 4, the particular egress line card 315 of the ingress BFR may identify the next hops associated with the particular entries as being the next hops for the multicast packet.

In some implementations, the particular egress line card 315 of the ingress BFR may create a copy of the multicast packet for each of the destination addresses based on the entries of the modified BIFT. For example, if the modified BIFT includes particular entries for forwarding the multicast packet to BFRs associated with BFR-ids 2, 3, and 4, the particular egress line card 315 of the ingress BFR may create a first copy of the multicast packet that includes a bit string (e.g., 0010) that corresponds to a destination address associated with BFR-id 2; a second copy of the multicast packet that includes a bit string (e.g., 0100) that corresponds to a destination address associated with BFR-id 3; and a third copy of the multicast packet that includes a bit string (e.g., 1000) that corresponds to a destination address associated with BFR-id 4.

As further shown in FIG. 6, process 600 may include forwarding, via the egress line card, the copies of the multicast packet toward the destinations associated with the destination addresses (block 660). For example, the particular egress line card 315 of the ingress BFR may forward the copies of the multicast packet to the identified next hops, and the identified next hops may forward the copies of the multicast packet on to destinations associated with the destination addresses provided in the packet header.

In some implementations, the particular egress line card 315 of the ingress BFR may forward the copies of the multicast packet to different identified next hops. For example, the particular egress line card 315 of the ingress BFR may provide the first copy of the multicast packet to a first next hop, and the first next hop may utilize the bit string of 0010 to forward the first copy of the multicast packet towards a BFR associated with BFR-id 2. The particular egress line card 315 of the ingress BFR may provide the second copy of the multicast packet to a second next hop, and the second next hop may utilize the bit string of 0100 to forward the second copy of the multicast packet towards a BFR associated with BFR-id 3. The particular egress line card 315 of the ingress BFR may provide the third copy of the multicast packet to a third next hop, and the third next hop may utilize the bit string of 1000 to forward the third copy of the multicast packet towards a BFR associated with BFR-id 4. In some implementations, the particular egress line card 315 of the ingress BFR may provide one or more copies of the multicast packet directly to the destinations, without utilizing a next hop (e.g., when the destinations are connected to the ingress BFR).

In some implementations, ingress line card 305 of the ingress BFR may determine that a multicast packet is to be provided to a first set of neighbor BFRs (e.g., four BFRs) associated with a first egress line card 315 of the ingress BFR and to a second set of neighbor BFRs (e.g., six BFRs) associated with a second egress line card 315 of the ingress BFR. In such implementations, ingress line card 305 may provide a first copy of the multicast packet to the first egress line card 315, and may provide a second copy of the multicast packet to the second egress line card 315. The first egress line card 315 may create three additional copies of the first multicast packet copy, and may provide the four copies of the multicast packet to the four BFRs of the first set of neighbor BFRs. The second egress line card 315 may create five additional copies of the second multicast packet copy, and may provide the six copies of the multicast packet to the six BFRs of the second set of neighbor BFRs.

In some implementations, the modified BIFT of the ingress BFR may be utilized in the following manner. For an incoming packet associated with a bit string, the ingress BFR may perform a lookup of the modified BIFT, based on a lowest bit of the bit string (e.g., a bit furthest to the right, such as 1 in the bit string 0001), in order to identify a neighbor BFR, a F-BM, a LC-id, and a F-BM-LC. If the identified line card is within (e.g., a local line card) the ingress BFR, the BIER forwarding method may be utilized for the lowest bit of the bit string. If the identified line card is associated with external BFRs (e.g., a remote egress line card), the ingress BFR may store the identified egress line card and utilize the F-BM-LC to mask off the lowest bit of the bit string. The remote egress line card may provide copies of the multicast packet to all neighbor BFRs associated with the remote egress line card. The ingress BFR may repeat this procedure for all bits of the bit string. After repeating the procedure, the ingress BFR may have performed local replication of the multicast packet, and may have stored a list of remote egress line cards to which to send the multicast packet. The ingress BFR may split the list of remote line egress cards into two groups, and may replicate the multicast packet to two remote egress line cards (e.g., one remote egress line card from each group). Each remote egress line card may combine the multicast packet's bit string with a bitmask to obtain bits for which the remote egress line card and downstream line cards are responsible.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel. In some implementations, process 400 (FIG. 4) and process 600 (FIG. 6) may be combined within network device 210, such as a BFR. In some implementations, process 400 and/or process 600 may be utilized by one or more network devices 210 of network 220.

Figure 7A:
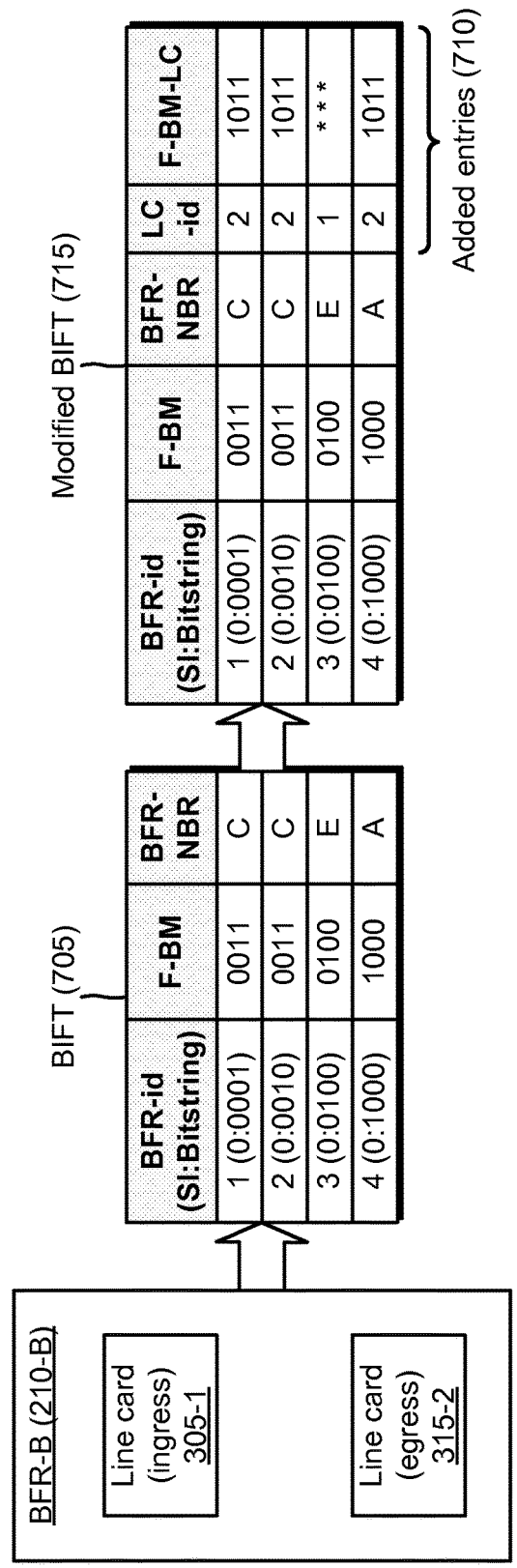
FIGS. 7A-7C are diagrams of an example implementation relating to the example process shown in FIG. 6.
Figure 7B:
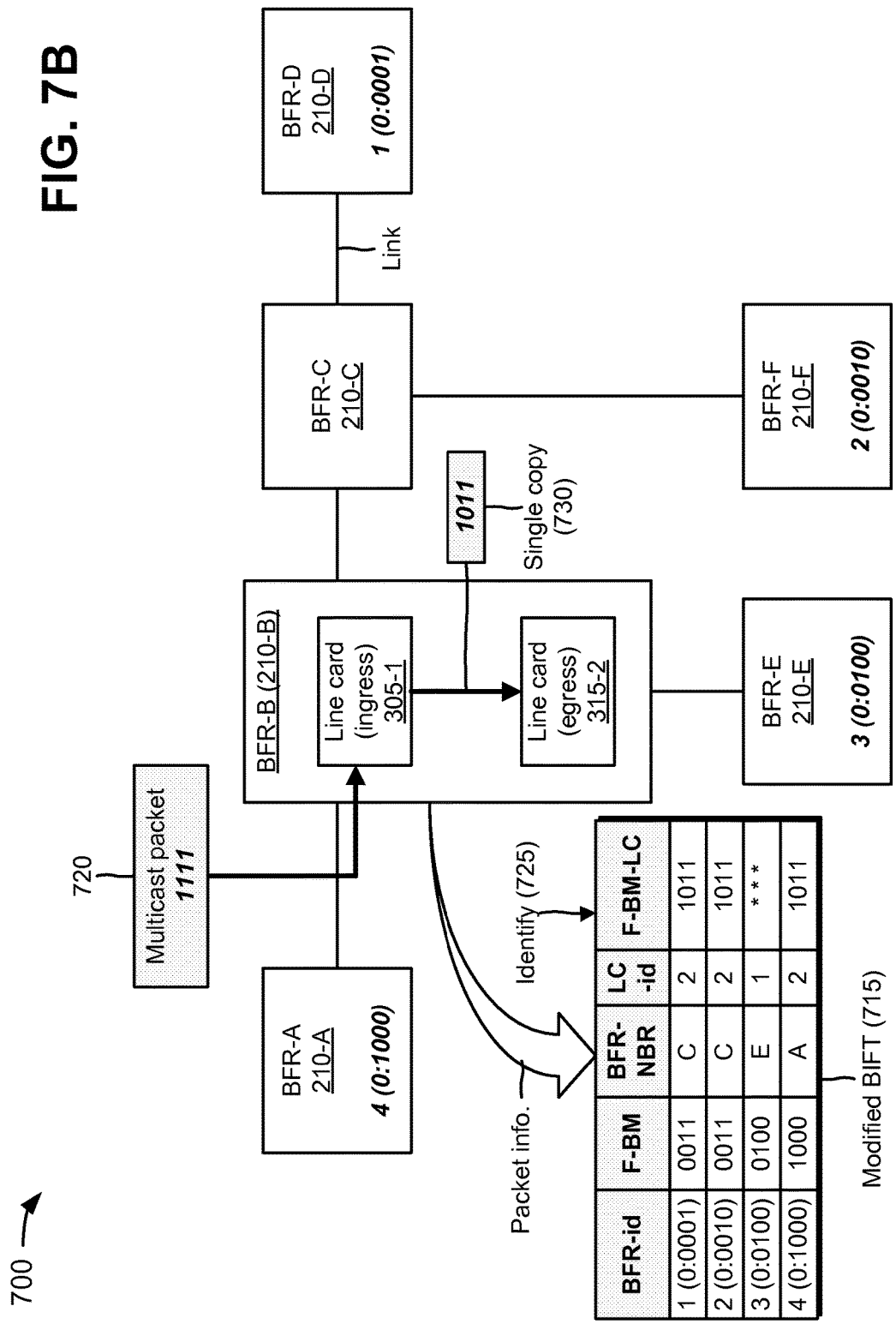
Figure 7C:
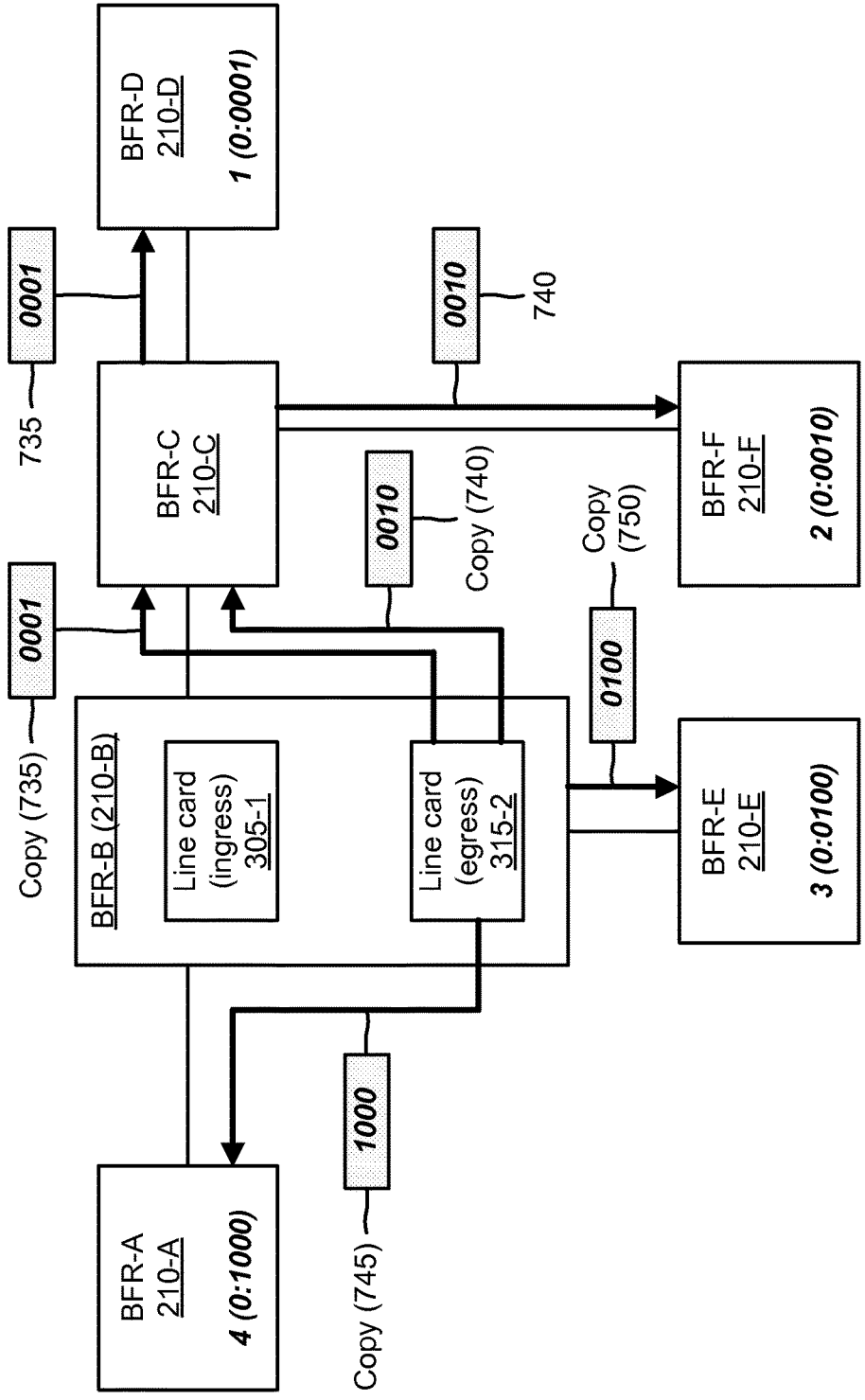

FIGS. 7A-7C are diagrams of an example implementation 700 relating to example process 600 shown in FIG. 6. FIGS.

7A-7C show an example of modifying a BIFT and forwarding a multicast packet based on the modified BIFT.

As shown in FIG. 7A, a multicast domain may include network device 210, such as BFR-B (210-B). BFR-B may include ingress line card 305-1 associated with a line card identifier (e.g., LC-id of 1), and egress line card 315-2 associated with a line card identifier (e.g., LC-id of 2). As further shown in FIG. 7A, BFR-B may be associated with a BIFT 705 that includes a column for BFR-ids, a column for forwarding-bit masks (F-BMs), and a column for neighbor BFRs (BFR-NBRs). BFR-B may add entries 710 for line card identifiers (LC-ids) and entries 715 for F-BMs associated with the line cards of BFR-B to BIFT 705 in order to create a modified BIFT 715. For example, BFR-B may add a LC-id column and a F-BM-LC column to BIFT 705 in order to create modified BIFT 715.

As shown in FIG. 7B, the multicast domain may further include multiple network devices 210, such as BFR-A (210-A), BFR-B (210-B), BFR-C (210-C), BFR-D (210-D), BFR-E (210-E), and BFR-F (210-F), interconnected by links. Each BFR 210 in the multicast domain may be assigned a unique BFR-id. BFR-D may include a BFR-id of one (1), a SI of zero (0), and a bit string of 0001; BFR-F may include a BFR-id of two (2), a SI of zero (0), and a bit string of 0010; BFR-E may include a BFR-id of three (3), a SI of zero (0), and a bit string of 0100; and BFR-A may include a BFR-id of four (4), a SI of zero (0), and a bit string of 1000. Although such information is not shown for BFR-B and BFR-C in FIG. 7B, BFR-B and BFR-C may also be associated with BFR-ids, SIs, and/or bit strings.

As further shown in FIG. 7B, BFR-B may receive a multicast packet 720 that includes a payload and a packet header with a bit string of 1111. The bit string of 1111 may indicate that multicast packet 720 is to be delivered to BFRs 210 with BFR-ids of 1 (e.g., BFR-D, as indicated by the 0001 portion of the bit string), 2 (e.g., BFR-F, as indicated by the 0010 portion of the bit string), 3 (e.g., BFR-E, as indicated by the 0100 portion of the bit string), and 4 (e.g., BFR-A, as indicated by the 1000 portion of the bit string). BFR-B may perform a hash of multicast packet 720 to identify the packet information (e.g., the bit string of the packet header).

As further shown in FIG. 7B, BFR-B may compare the bit string of 1111 (e.g., as identified based on the hash of multicast packet 720) with modified BIFT 715 in order to identify 725 entries that provide forwarding information for multicast packet 720. For example, BFR-B may utilize a first bit of the bit string (e.g., the quoted bit in the bit string 111"1") to determine that multicast packet 720 is to be provided to egress line card 315-2 (e.g., LC-id). BFR-B may further determine that egress line card 315-2 is associated with F-BC-LC of 1011. Therefore, BFR-B may utilize a third bit of the bit string (e.g., the quoted bit in the bit string 1"1"11) to determine that multicast packet 720 is to be provided to BFR-E via ingress line card 305-1. Ingress line card 305-1 may provide a single copy 730 of multicast packet 720 (e.g., with a bit string of 1011) to egress line card 315-2.

As shown in FIG. 7C, based on the comparison of the bit string 1111 and modified BIFT 715, egress line card 315-2 of BFR-B may create a first copy 735 of multicast packet 720 that includes a bit string of 0001 in a packet header. Egress line card 315-2 of BFR-B may forward first packet copy 735 to BFR-C, and BFR-C may receive first packet copy 735. The bit string of 0001 may indicate to BFR-C that first packet copy 735 is to be forwarded to BFR 210 with a BFR-id of 1 (e.g., BFR-D). Therefore, BFR-C may forward first packet copy 735 to BFR-D, and BFR-D may receive first packet copy 735. Egress line card 315-2 of BFR-B may create a second copy 740 of multicast packet 720 that includes a bit string of 0010 in a packet header. Egress line card 315-2 of BFR-B may forward second packet copy 740 to BFR-C, and BFR-C may receive second packet copy 740. The bit string of 0010 may indicate to BFR-C that second packet copy 740 is to be forwarded to BFR 210 with a BFR-id of 2 (e.g., BFR-F). Therefore, BFR-C may forward second packet copy 740 to BFR-F, and BFR-F may receive second packet copy 740.

In some implementations, egress line card 315-2 of BFR-B may create a single copy of multicast packet 720 that includes a bit string of 0011 in a packet header. Egress line card 315-2 of BFR-B may forward the copy to BFR-C, and BFR-C may make two copies of multicast packet 720 (e.g., one with a bit string of 0001 and one with a bit string of 0010). BFR-C may forward the copies of multicast packet 720 to BFR-D and BFR-F.

As further shown in FIG. 7C, egress line card 315-2 of BFR-B may create a third copy 745 of multicast packet 720 that includes a bit string of 1000 in a packet header. Egress line card 315-2 of BFR-B may forward third packet copy 745 to BFR-A, and BFR-A may receive third packet copy 745. The bit string of 1000 may indicate to BFR-A that third packet copy 745 is to be received by BFR-A since BFR-A includes a BFR-id of 1. Ingress line card 305-1 may cause BFR-B to create a fourth copy 750 of multicast packet 720 that includes a bit string of 0100 in a packet header. BFR-B may forward fourth packet copy 750 to BFR-E, and BFR-E may receive fourth packet copy 750. The bit string of 0100 may indicate to BFR-E that fourth packet copy 750 is to be received by BFR-E since BFR-E includes a BFR-id of 2.

As indicated above, FIGS. 7A-7C are provided merely as an example. Other examples are possible and may differ from what was described with regard to FIGS. 7A-7C.

Systems and/or methods, described herein, may extend the BIER forwarding method to a component level of a network device. The systems and/or methods may utilize a cache that enables an egress component of the network device to analyze an entire bit string of a multicast packet when forwarding the multicast packet. Additionally, or alternatively, the systems and/or methods may enable an ingress component of the network device to forward a single copy of the multicast packet to the egress component, and the egress component may forward copies of the multicast packet. The systems and/or methods may reduce a workload on the components of the network device caused by the BIER forwarding method.

The foregoing disclosure provides illustration and description, but is not intended to be exhaustive or to limit the implementations to the precise form disclosed. Modifications and variations are possible in light of the above disclosure or may be acquired from practice of the implementations. For example, while the systems and/or methods, described herein, are described in the context of BFRs for simplicity, these systems and/or methods may equally apply in the context of other types of network devices.

As used herein, the term component is intended to be broadly construed as hardware, firmware, and/or a combination of hardware and software.

As used herein, a packet may refer to a network packet, a frame, a datagram, a segment, a fragment of a packet, a fragment of a frame, a fragment of a datagram, a fragment of a segment, or any other formatted or unformatted unit of data capable of being transmitted via a network.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network device, comprising:
   an ingress line card;
   one or more egress line cards; and
   one or more processors to:
      store a bit index forwarding table (BIFT) that includes information associated with destinations and information associated with next hops for the destinations;
      modify the BIFT to include information associated with the one or more egress line cards and information associated with masks for the one or more egress line cards,
         the information associated with the one or more egress line cards including identifiers for the one or more egress line cards,
         the masks indicating destinations reachable via corresponding next hops, and
         each mask, of the masks, being created based on one or more next hop masks associated with one or more next hops corresponding to each mask;
      receive, via the ingress line card, a multicast packet that includes information identifying destinations for the multicast packet;
      identify an egress line card, of the one or more egress line cards, for receiving the multicast packet based on the information identifying the destinations and based on the modified BIFT;
      cause the ingress line card to provide the multicast packet to the identified egress line card;
      create, via the identified egress line card, two or more copies of the multicast packet; and
      forward, via the identified egress line card, the two or more copies of the multicast packet toward two or more of the destinations.

2. The network device of claim 1, where the one or more processors are further to:
   store the modified BIFT; and
   program the modified BIFT into a data plane used to forward multicast packets.

3. The network device of claim 1, where the network device is associated with a bit index explicit replication (BIER) forwarding method.

4. The network device of claim 1, where the one or more processors are further to:
   identify particular next hops associated with the modified BIFT and associated with two or more of the destinations; and
   forward the two or more copies of the multicast packet to the particular next hops to permit the particular next hops to forward the multicast packet toward the two or more of the destinations.

5. The network device of claim 4, where the one or more processors are further to:
   create a copy of the multicast packet for each of the particular next hops; and
   forward a corresponding copy of the two or more copies of the multicast packet to a corresponding one of the particular next hops.

6. The network device of claim 1, where the one or more processors are further to:
   apply a transformation function to a header of the multicast packet to identify information contained in the header,
      the transformation function including one of:
         a hash function,
         a checksum,
         a check digit,
         a fingerprint, or
         a randomization function.

7. A method, comprising:
   storing a bit index forwarding table (BIFT) that includes information associated with destinations and information associated with next hops for the destinations;
   modifying, by a network device provided in a network, the BIFT to include information associated with one or more egress line cards of the network device and information associated with masks for the one or more egress line cards,
      the information associated with the one or more egress line cards including identifiers for the one or more egress line cards,
      the masks indicating destinations reachable via corresponding next hops, and
      each mask, of the masks, being created based on one or more next hop masks associated with one or more next hops corresponding to each mask;
   receiving, by an ingress line card of the network device, a multicast packet that includes information identifying destinations for the multicast packet;
   identifying, by the network device, an egress line card, of the one or more egress line cards, for receiving the multicast packet based on the information identifying the destinations and based on the modified BIFT;
   causing, by the network device, the ingress line card to provide a single copy of the multicast packet to the identified egress line card;
   creating, by the identified egress line card, two or more copies of the multicast packet; and forwarding, by the identified egress line card, the two or more copies of the multicast packet toward two or more of the destinations.

8. The method of claim 7, further comprising:
programming the modified BIFT into a data plane associated with the network device and used to forward multicast packets.

9. The method of claim 7, where the network device is associated with a bit index explicit replication (BIER) forwarding method.

10. The method of claim 7, comprising:
identifying particular next hops associated with the modified BIFT and associated with the two or more of the destinations; and
forwarding the two or more copies of the multicast packet to the particular next hops to permit the particular next hops to forward the multicast packet toward the two or more of the destinations.

11. The method of claim 7, where the network device includes a bit forwarding device.

12. The method of claim 7, further comprising:
applying a transformation function to a header of the multicast packet to identify information contained in the header,
the transformation function including one of:
a hash function,
a checksum,
a check digit,
a fingerprint, or
a randomization function.

13. A network device associated with a bit index explicit replication (BIER) forwarding method, the network device comprising:
one or more processors to:
store a bit index forwarding table (BIFT) that includes information associated with destinations and information associated with next hops for the destinations;
receive multicast packets that include information identifying the destinations;
identify next hops associated with the destinations;
populate a cache with the destinations and addresses of the identified next hops;
receive a particular multicast packet that includes information identifying particular destinations;
determine whether the particular destinations are included in the cache;
forward the particular multicast packet based on the BIFT when the particular destinations are not included in the cache; and
when the particular destinations are included in the cache:
identify one or more next hops for the particular destinations from the cache, and
forward the particular multicast packet to the identified one or more next hops to permit the identified one or more next hops to forward the multicast packet toward the particular destinations.

14. The network device of claim 13, where, when the particular destinations are not included in the cache, the one or more processors are further to:
identify particular next hops associated with the particular destinations; and
populate the cache with the particular destinations and addresses of the identified particular next hops.

15. The network device of claim 13, where the one or more processors are further to:
create a copy of the multicast packet for each of the identified one or more next hops; and
forward the copy of the multicast packet to each of the identified one or more next hops.

16. The network device of claim 13, where the one or more processors are further to:
store the cache; and
program the cache into a data plane used to forward multicast packets.

17. The network device of claim 13, where the one or more processors are further to:
remove entries included in the cache for longer than a predetermined time period.

18. A method, comprising:
storing, by a network device in a network, a bit index forwarding table (BIFT) that includes information associated with destinations and information associated with next hops for the destinations;
receiving, by the network device, multicast packets that include information identifying the destinations in the network;
identifying, by the network device, next hops associated with the destinations;
populating, by the network device, a cache with the destinations and addresses of the identified next hops;
receiving, by the network device, a particular multicast packet that includes information identifying particular destinations;
determine whether the particular destinations are included in the cache;
forwarding the particular multicast packet based on the BIFT when the particular destinations are not included in the cache; and
when the particular destinations are included in the cache:
identifying, by the network device, one or more next hops for the particular destinations from the cache; and
forwarding, by the network device, the particular multicast packet to the identified one or more next hops to permit the identified one or more next hops to forward the multicast packet toward the particular destinations.

19. The method of claim 18, further comprising:
creating a copy of the multicast packet for each of the identified one or more next hops; and
forwarding the copy of the multicast packet to each of the identified one or more next hops.

20. The method of claim 18, further comprising:
removing entries included in the cache for longer than a predetermined time period.

* * * * *